United States Patent
Ahn (10) Patent No.: US 11,951,830 B2
(45) Date of Patent: Apr. 9, 2024

(54) CONTROLLER FOR VEHICLE DISCONNECTOR APPARATUS AND CONTROL METHOD OF VEHICLE DISCONNECTOR APPARATUS BASED ON TEMPERATURE

(71) Applicant: Hyundai Transys Inc., Seosan-si (KR)

(72) Inventor: Jong Bae Ahn, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 0 days.

(21) Appl. No.: 17/952,772

(22) Filed: Sep. 26, 2022

(65) Prior Publication Data

US 2023/0105370 A1    Apr. 6, 2023

(30) Foreign Application Priority Data

Sep. 24, 2021    (KR) .......................... 10-2021-0126464

(51) Int. Cl.
*B60K 23/08*    (2006.01)
*B60K 17/346*    (2006.01)

(52) U.S. Cl.
CPC ............ *B60K 23/08* (2013.01); *B60K 17/346* (2013.01); *B60K 2023/0858* (2013.01)

(58) Field of Classification Search
CPC .................. B60K 23/08; B60K 17/346; B60K 2023/0858; B60K 1/00; B60K 17/356; B60K 17/02; B60Y 2200/91; B60Y 2400/405; B60Y 2400/422
See application file for complete search history.

(56) References Cited

U.S. PATENT DOCUMENTS

| 2014/0136062 A1* | 5/2014 | Mita ...................... B60K 23/08 701/65 |
| 2015/0096821 A1* | 4/2015 | Arai ...................... B60W 10/02 180/233 |
| 2017/0023075 A1* | 1/2017 | Nozu ...................... F16D 48/06 |

FOREIGN PATENT DOCUMENTS

| EP | 2770229 A1 * | 8/2014 | ......... F16H 57/0445 |
| KR | 10-0769420 B1 | 10/2007 | |
| WO | WO-2015068822 A1 * | 5/2015 | ............. F16D 13/54 |

* cited by examiner

*Primary Examiner* — Justin Holmes
(74) *Attorney, Agent, or Firm* — Bridgeway IP Law Group, PLLC; Jihun Kim (57) ABSTRACT

Provided is a controller for a vehicle disconnector apparatus, the controller including: a transceiving unit for receiving vehicle inside and outside information including a temperature of outside air of a vehicle and an oil temperature of a reducer; a determination unit for determining whether it is possible to control the vehicle disconnector apparatus based on the temperature of the outside air of the vehicle and the oil temperature of the reducer; and a control unit for controlling the disconnector apparatus in consideration of a result of the determination of the determination unit.

12 Claims, 6 Drawing Sheets

CONTROLLER FOR VEHICLE DISCONNECTOR APPARATUS AND CONTROL METHOD OF VEHICLE DISCONNECTOR APPARATUS BASED ON TEMPERATURE

CROSS-REFERENCE TO RELATED APPLICATIONS

This application claims priority to and the benefit of Korean Patent Application No. 10-2021-0126464 filed in the Korean Intellectual Property Office on Sep. 24, 2021, the entire contents of which are incorporated herein by reference.

TECHNICAL FIELD

The present invention relates to a controller for a vehicle disconnector apparatus, and a control method of a vehicle disconnector apparatus based on a temperature.

BACKGROUND ART

In general, a disconnector apparatus is a device that is applied to an electric vehicle to minimize unnecessary power (drag torque) loss and improve fuel efficiency by, depending on the driving situation of the vehicle, engaging the teeth of the sleeve with the teeth of the differential shaft to convert a driving mode to four-wheel drive (4WD) by power connection, or by separating the teeth of the sleeve from the teeth of the differential shaft and converting the driving mode to two-wheel drive (2WD).

A Vehicle Controller Unit (VCU) of the vehicle drives each of a motor of the disconnector apparatus and a driving motor of a front wheel reducer connected to a differential assembly according to the driving state of the vehicle.

The motor of the disconnector apparatus is combined with a ball screw. The motor of the disconnector apparatus may perform fastening or releasing of the fastening with the differential shaft by moving a fork and a sleeve coupled to the ball screw that converts rotational motion into linear motion. Through this, the vehicle can be driven by four-wheel drive (4WD) or two-wheel drive (2WD).

On the other hand, in the case of the disconnector apparatus fastened to the differential assembly, responsiveness to control commands is delayed due to oil being cooled in the low-temperature or cryogenic outside air state of the vehicle, so that the fastening or the release of the fastening is not performed smoothly, thereby causing problems, such as malfunction of the vehicle and damage to components.

SUMMARY OF THE INVENTION

The present invention has been made in an effort to provide a controller for vehicle disconnector apparatus which detects a temperature state of the outside air of a vehicle and an oil temperature state and adjusts an oil temperature through heat generated according to driving of a reducer by driving the reducer based on the detected temperature states to enable a differential shaft and a sleeve of the disconnector apparatus to be smoothly fastened in a low temperature or cryogenic state, and a control method of a vehicle disconnector apparatus based on a temperature.

An exemplary embodiment of the present invention provides a controller for a vehicle disconnector apparatus, the controller including: a transceiving unit for receiving vehicle inside and outside information including a temperature of outside air of a vehicle and an oil temperature of a reducer; a determination unit for determining whether it is possible to control the vehicle disconnector apparatus based on the temperature of the outside air of the vehicle and the oil temperature of the reducer; and a control unit for controlling the disconnector apparatus in consideration of a result of the determination of the determination unit.

The transceiving unit may receive a control command of the disconnector apparatus according to a vehicle driving situation.

When the control command of the disconnector apparatus is received, the determination unit may compare the oil temperature of the reducer with a preset reference temperature.

When the oil temperature of the reducer exceeds the reference temperature, the determination unit may determine a first state of the oil temperature of the reducer as a normal state, and when the oil information of the reducer is equal to or lower than the reference temperature, the determination unit may determine the first state of the oil temperature of the reducer as an abnormal state.

When it is determined that the first state of the oil temperature of the reducer is an abnormal state, the determination unit may compare the oil temperature of the reducer with the temperature of the outside air of the vehicle.

When the oil temperature of the reducer exceeds the temperature of the outside air of the vehicle, the determination unit may determine the second state of the oil temperature of the reducer as a normal state, and when the oil temperature of the reducer is equal to or lower than the temperature of the outside air of the vehicle, the determination unit may determine that a second state of the oil temperature of the reducer is an abnormal state.

When the first state or the second state of the oil temperature of the reducer is the abnormal state, the control unit may drive the reducer to adjust the oil temperature of the reducer.

When the first state or the second state of the oil temperature of the reducer is in the normal state, the control unit may control the disconnector apparatus to perform a fastening or fastening releasing operation.

Another exemplary embodiment of the present invention provides a control method of a vehicle disconnector apparatus based on a temperature, the control method including: a receiving operation of receiving vehicle inside and outside information including a control command of a disconnector apparatus, an oil temperature of a reducer, and a temperature of outside air of the vehicle; a first state determination operation of determining a first state of the oil temperature of the reducer by comparing the oil temperature of the reducer with a preset reference temperature when the control command of the disconnector apparatus is received; and a disconnector apparatus control operation of controlling the disconnector apparatus according to the control command of the disconnector apparatus when a first state of the oil temperature of the reducer is a normal state.

The first state determination operation may include determining the first state of the oil temperature of the reducer as an abnormal state when the oil temperature of the reducer is equal to or lower than the reference temperature, and determining the first state of the oil temperature of the reducer as a normal state when the oil temperature of the reducer exceeds the reference temperature.

The control method may further include a reducer control operation of controlling the reducer to adjust the oil temperature of the reducer when the first state of the oil temperature of the reducer is an abnormal state.

The control method may further include a second state determination operation of determining a second state of the oil temperature of the reducer by comparing the oil temperature of the reducer with the temperature of the outside air of the vehicle after the reducer control operation.

The second state determination operation may include determining a second state of the oil temperature of the reducer as an abnormal state when the oil temperature of the reducer is equal to or lower than the reference temperature, and determining the second state of the oil temperature of the reducer as a normal state when the oil temperature of the reducer exceeds the reference temperature.

The disconnector apparatus control operation may include controlling the disconnector apparatus according to the control command of the disconnector apparatus when the second state of the oil temperature of the reducer is the normal state.

According to the controller for the vehicle disconnector apparatus and the control method of the vehicle disconnector apparatus based on the temperature according to the exemplary embodiments of the present invention, there is an effect in that a differential shaft and a sleeve of the disconnector apparatus may be smoothly fastened in a low temperature or cryogenic state by detecting a temperature state of the outside air of a vehicle and an oil temperature state and adjusting an oil temperature through heat generated according to driving of a reducer by driving the reducer based on the detected temperature states.

There is an effect of maintaining performance and maximally using durability of the disconnector apparatus.

There is an effect of securing the performance and fuel efficiency of the disconnector apparatus through the accurate fastening of the disconnector apparatus in an optimal temperature state.

There is an effect of preventing in advance the occurrence of a unfastening defect of the disconnector apparatus.

The foregoing summary is illustrative only and is not intended to be in any way limiting. In addition to the illustrative aspects, exemplary embodiments, and features described above, further aspects, exemplary embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, it should be noted that in giving reference numerals to elements of each drawing, like reference numerals refer to like elements even though like elements are illustrated in different drawings. It should be understood that although the exemplary embodiment of the present invention is described hereafter, the spirit of the present invention is not limited thereto and the present invention may be changed and modified in various ways by those skilled in the art.

Figure 1:
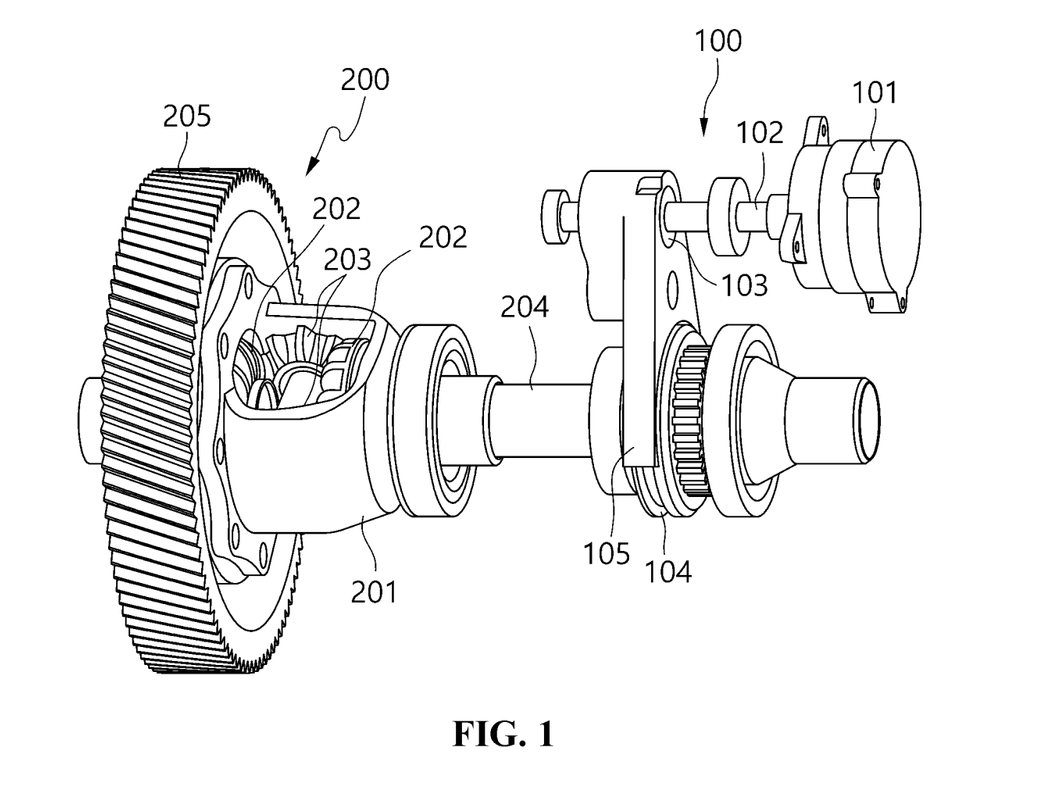
FIG. 1 is a diagram illustrating a disconnector apparatus.
Figure 2:
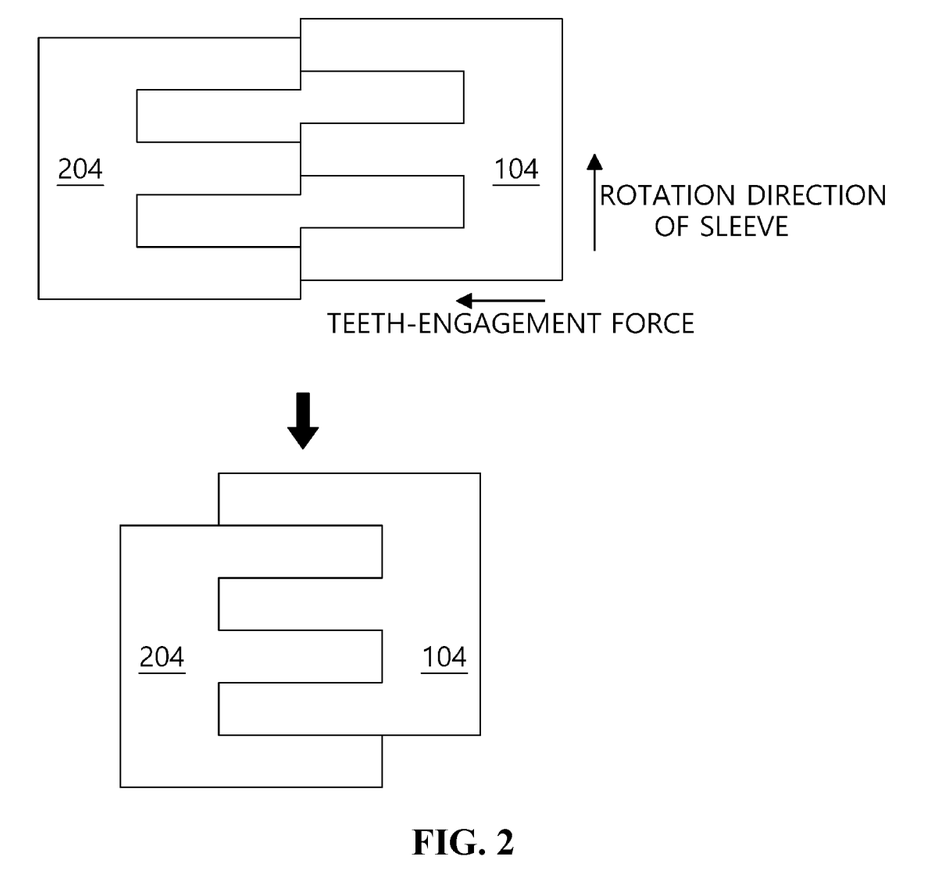
FIG. 2 is a diagram schematically illustrating a teeth-engagement process between a differential shaft and a sleeve of the disconnector apparatus.

FIG. 1 is a diagram illustrating a disconnector apparatus, and FIG. 2 is a diagram schematically illustrating a teeth-engagement process between a differential shaft and a sleeve of the disconnector apparatus.

Referring to FIGS. 1 and 2, a disconnector apparatus 100 is connected to a differential assembly 200. A differential gear set is mounted inside a differential case 201 of the differential assembly 200. The differential gear set includes two side gears 202 and two pinion gears 203 teeth-engaged with the two side gears 202.

The disconnector apparatus 100 is connected to the differential assembly 200. The differential assembly 200 includes the differential case 201, the two side gears 202 provided inside the differential case 201, and a differential shaft 204 connected to any one of the two side gears 202. The disconnector apparatus 100 includes a motor 101 for generating power, a ball screw shaft 102 connected to the motor 101, and a nut 103 movable along the ball screw shaft 102 at one end, and includes a fork 105 connected to the sleeve 104 at the other end. The fork 105 may move the sleeve 104 in the direction of the differential shaft 204 so that the sleeve 104 is teeth-engaged with the differential shaft 204 so that four-wheel drive (4WD) is achieved, and the sleeve 104 may move in a direction opposite to the differential shaft 204 to separate the sleeve 104 from the differential shaft 204 to achieve two-wheel drive (2WD).

In the case of the disconnector apparatus 100, responsiveness to control commands is delayed due to oil being cooled in the low-temperature or cryogenic outside of the vehicle, so that the fastening or the release of the fastening is not performed smoothly, thereby causing problems, such as malfunction of the vehicle and damage to components, and hereinafter, a method of solving the foregoing problem will be described.

Figure 3:
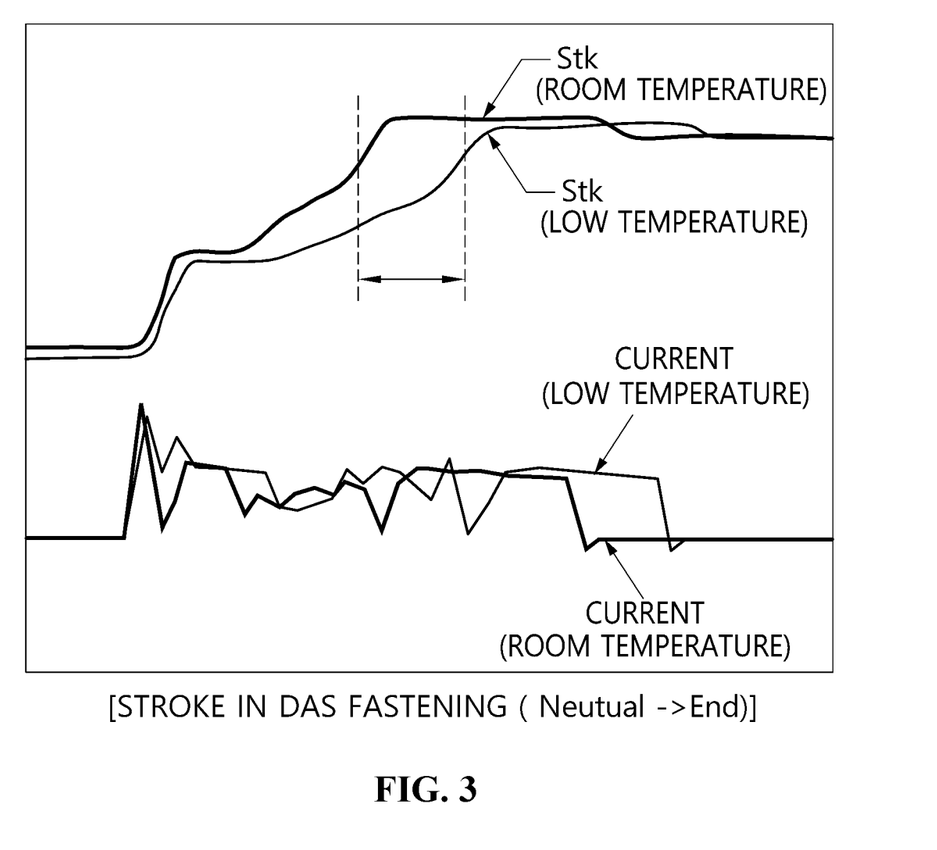
FIG. 3 is a diagram for explaining a fastening impossible mechanism of the disconnector apparatus of FIG. 1.

FIG. 3 is a diagram for explaining a fastening impossible mechanism of the disconnector apparatus of FIG. 1.

Referring to FIG. 3, it can be seen that the stroke Stk at room temperature (about 25 degrees or more) according to the fastening operation of the disconnector apparatus 100 is higher than the stroke Stk at low temperature (about 25 degrees or less). In addition, it can be seen that the room temperature current and the low temperature current flowing through the motor 101 are different.

As such, when the outside air state of the vehicle is at a low temperature, the stroke of the disconnector apparatus 100 is weak, and thus a situation in which a complete fastening operation is not performed may occur.

Figure 4:
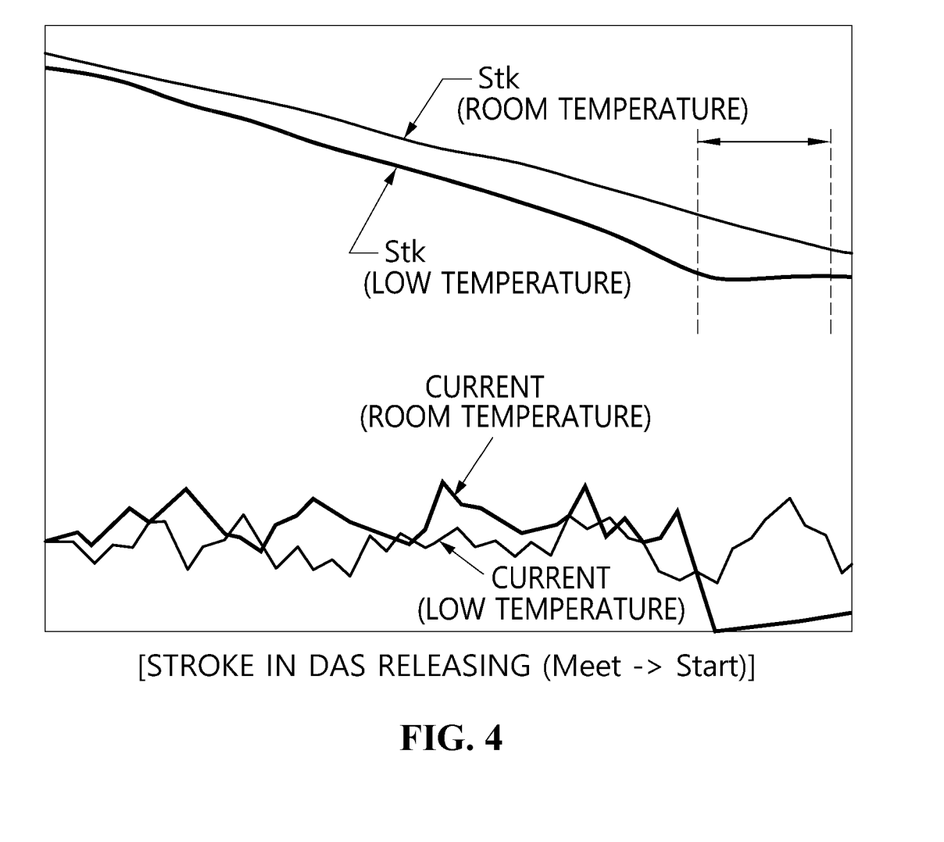
FIG. 4 is a view illustrating a change in stroke according to a fastening releasing operation of the disconnector apparatus of FIG. 1.

FIG. 4 is a view illustrating a change in stroke according to a fastening releasing operation of the disconnector apparatus of FIG. 1.

Referring to FIG. 4, it can be seen that the stroke Stk at room temperature (about 25 degrees or more) according to the fastening releasing operation of the disconnector apparatus 100 is lower than the stroke Stk at low temperature (about 25 degrees or less). In addition, it can be seen that the room temperature current and the low temperature current flowing through the motor 101 are different.

As described above, when the vehicle outside air state is at a low temperature, a situation in which the low-temperature stroke Stk required for the fastening releasing operation of the disconnector apparatus 100 is required to be greater than the normal-temperature stroke Stk may occur.

Hereinafter, a method of maintaining the stroke Stk for the fastening or the fastening releasing operation of the disconnector apparatus 100 close to the stroke Stk in the vehicle outside air state at room temperature when the vehicle outside air state is low temperature will be described below.

Figure 5:
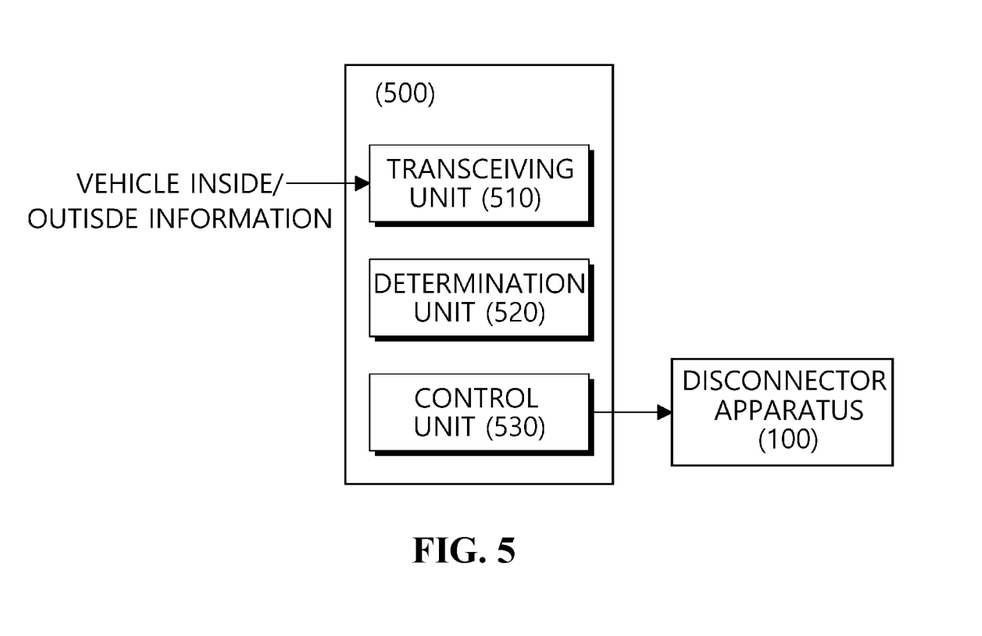
FIG. 5 is a block diagram of a controller for the vehicle disconnector apparatus according to an exemplary embodiment of the present invention.

FIG. 5 is a block diagram of a controller for the vehicle disconnector apparatus according to an exemplary embodiment of the present invention.

Referring to FIG. 5, a controller 500 for a vehicle disconnector apparatus according to an exemplary embodiment of the present invention controls the operation of the disconnector apparatus 100 in consideration of the vehicle outside air state and oil temperature, and includes a transceiving unit 510, a determination unit 520, and a control unit 530.

The transceiving unit 510 may receive vehicle inside and outside information. Here, the vehicle inside and outside information may include temperature information of the outside air of the vehicle, oil temperature information of the reducer, a control command of the disconnector apparatus, and the like. The temperature information of the outside air of the vehicle may be acquired through a separate temperature sensor device. The oil temperature information of the reducer may be acquired through a separate oil temperature measuring device. The control command of the disconnector apparatus may be generated according to the driving state of the vehicle.

When a control command of the disconnector apparatus is received, the determination unit 520 may determine whether it is possible to control the disconnector apparatus in consideration of the temperature information of the outside air of the vehicle and the oil temperature information of the reducer. In the exemplary embodiment, first, the determination unit 520 may determine whether the oil temperature of the reducer exceeds a preset reference temperature. The reference temperature may be appropriately set according to vehicle specifications, and may be set to approximately 25 degrees.

When the oil temperature of the reducer exceeds the reference temperature, the determination unit 520 may determine a first state of the oil temperature of the reducer required to control the disconnector apparatus 100 as a room temperature state. Here, the reducer (not illustrated) and the disconnector apparatus 100 may be provided in an integrated housing (not illustrated), so that their oil temperatures may be similar to each other. That is, the determination unit 520 may determine the stroke required for fastening or releasing the fastening of the disconnector apparatus 100 as normal.

When the oil temperature of the reducer is equal to or lower than the reference temperature, the determination unit 520 may determine the first state of the oil temperature of the reducer required to control the disconnector apparatus 100 as an abnormal state. That is, the determination unit 520 may determine the stroke required for fastening or releasing the fastening of the disconnector apparatus 100 as an abnormal state. In this case, the oil temperature may be changed by the control of the reducer of the control unit 530.

Meanwhile, when the oil temperature of the reducer is equal to or lower than the reference temperature, the determination unit 520 may compare the oil temperature, which is continuously changed according to the control of the reducer by the control unit 530, with the temperature of the outside air of the vehicle. When the oil temperature exceeds the temperature of the outside air of the vehicle, the determination unit 520 may determine a second state of the oil temperature as a normal state. When the oil temperature is equal to or lower than the temperature of the outside air of the vehicle, the determination unit 520 may determine the second state of the oil temperature as an abnormal state.

The control unit 530 may determine whether to control the disconnector apparatus 100 in consideration of the determination result of the determination unit 520. When it is determined that the first state or the second state of the oil temperature of the reducer is the normal state, the control unit 530 may control the disconnector apparatus 100 to perform a fastening or fastening releasing operation according to the control command.

When it is determined that the first state or the second state of the oil temperature of the reducer is the abnormal state, the control unit 530 may control the reducer without controlling the disconnector apparatus 100. In this case, mechanical heat is generated according to the operation of the reducer, and the oil temperature may rise through the machine heat. Thereafter, when the first state or the second state of the oil temperature is changed to the normal state, the control unit 530 may control the disconnector apparatus 100.

Figure 6:
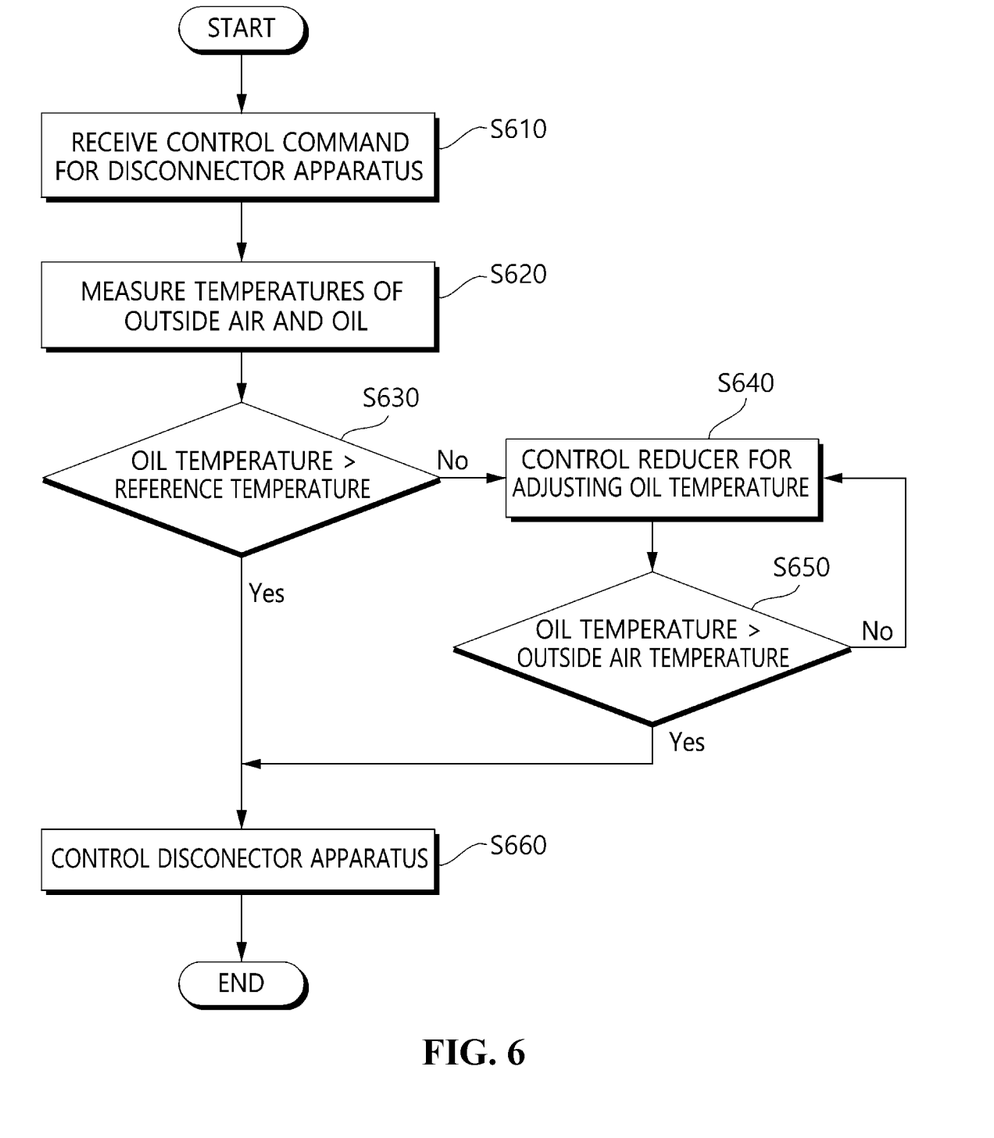
FIG. 6 is a flowchart of a control method of a vehicle disconnector apparatus based on a temperature according to an exemplary embodiment of the present invention.

FIG. 6 is a flowchart of a control method of a vehicle disconnector apparatus based on a temperature according to an exemplary embodiment of the present invention.

Referring to FIGS. 5 and 6, the control method of the vehicle disconnector apparatus based on the temperature according to the exemplary embodiment of the present invention may include, in order to control the operation of the disconnector apparatus 100 in consideration of an outside air state of the vehicle and an oil temperature, a receiving operation S610, a temperature measuring operation S620, a first state determination operation S630, a reducer control operation S640, a second state determination operation S650, and a disconnector apparatus control operation S660.

In the receiving operation S610, the transceiving unit 510 may receive a control command of the disconnector apparatus. The control command of the disconnector apparatus may be generated according to the driving state of the vehicle.

In the temperature measuring operation S620, the transceiving unit 510 may receive the temperature information of the outside air of the vehicle and the oil temperature information of the reducer. The temperature information of the outside air of the vehicle may be acquired through a separate temperature sensor device. The oil temperature information of the reducer may be acquired through a separate oil temperature measuring device.

In the first state determination operation S630, when the control command of the disconnector apparatus is received, the determination unit 520 may compare the oil temperature of the reducer with a preset reference temperature. The reference temperature may be appropriately set according to vehicle specifications, and may be set to approximately 25 degrees. When the oil temperature of the reducer exceeds the reference temperature, the determination unit 520 may determine a first state of the oil temperature of the reducer required to control the disconnector apparatus 100 as a room temperature state. Here, the reducer (not illustrated) and the disconnector apparatus 100 may be provided in an integrated housing (not illustrated), so that their oil temperatures may be similar to each other. That is, the determination unit 520 may determine the stroke required for fastening or releasing the fastening of the disconnector apparatus 100 as normal.

When the oil temperature of the reducer is equal to or lower than the reference temperature, the determination unit 520 may determine the first state of the oil temperature of the reducer required to control the disconnector apparatus 100 as an abnormal state. That is, the determination unit 520 may determine a stroke required for fastening or releasing the fastening of the disconnector apparatus 100 as abnormal. In this case, the oil temperature may be changed by the control of the reducer of the control unit 530.

In the reducer control operation S640, when it is determined that the first state of the oil temperature of the reducer is the abnormal state, the control unit 530 may perform the control of the reducer without performing the control of the disconnector apparatus 100. In this case, mechanical heat is generated according to the operation of the reducer, and the oil temperature may rise through the machine heat.

In the second state determination operation S650, the determination unit 520 may compare the oil temperature, which is continuously changed according to the control of the reducer by the control unit 530, with the outside air temperature of the vehicle. When the oil temperature exceeds the temperature of the outside air of the vehicle, the determination unit 520 may determine a second state of the oil temperature as a normal state. When the oil temperature is equal to or lower than the temperature of the outside air of the vehicle, the determination unit 520 may determine the second state of the oil temperature as an abnormal state.

In the disconnector apparatus control operation S660, when the control unit 530 determines that the first state or the second state of the oil temperature of the reducer is the normal state in the first state determination operation S630 or the second state determination operation S650, the control unit 530 may control the disconnector apparatus 100 to perform a fastening or fastening releasing operation according to the control command of the disconnector apparatus.

The control method of the vehicle disconnector apparatus based on the temperature according to the exemplary embodiment of the present invention may prevent in advance a situation in which the disconnector apparatus 100 cannot be fastened due to lack of stroke according to the low-temperature outside air state of the vehicle by performing the above operations.

Although the exemplary embodiment of the present invention has been described for illustrative purposes, those skilled in the art will appreciate that various modifications, additions and substitutions are possible, without departing from the essential characteristic of the invention. Therefore, the exemplary embodiments disclosed in the present invention and the accompanying drawings are not intended to limit the technical spirit of the present invention, but are intended to illustrate the scope of the technical idea of the present invention, and the scope of the present invention is not limited by the exemplary embodiment and the accompanying drawings.

The operations and/or operations according to the present invention may occur in different orders, or in parallel, or simultaneously in different exemplary embodiments for different epochs and the like as may be appreciated by those skilled in the art.

Depending on the exemplary embodiment, a part or the entirety of the operations and/or operations may be implemented or performed by using commands stored in one or more non-temporary computer-readable media, a program, an interactive data structure, and one or more processors driving a client and/or a server. One or more non-temporary computer-readable media are, for example, software, firmware, hardware, and/or any combination thereof. Further, the function of "module" discussed in the present specification may be implemented by software, firmware, hardware, and/or any combination thereof.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A controller for a vehicle disconnector apparatus, the controller comprising:
    a transceiving unit for receiving vehicle inside and outside information including a temperature of outside air of a vehicle and an oil temperature of a reducer;
    a determination unit for determining whether it is possible to control the vehicle disconnector apparatus based on the temperature of the outside air of the vehicle and the oil temperature of the reducer; and
    a control unit for controlling the vehicle disconnector apparatus in consideration of a result of the determination of the determination unit,
    wherein the transceiving unit receives a control command of the vehicle disconnector apparatus according to a vehicle driving situation.

2. The controller of claim 1, wherein when the control command of the vehicle disconnector apparatus is received, the determination unit compares the oil temperature of the reducer with a preset reference temperature.

3. The controller of claim 2, wherein when an oil temperature of the reducer exceeds the reference temperature, the determination unit determines a first state of the oil temperature of the reducer as a normal state, and
    when the oil temperature of the reducer is equal to or lower than the reference temperature, the determination unit determines the first state of the oil temperature of the reducer as an abnormal state.

4. The controller of claim 3, wherein when it is determined that the first state of the oil temperature of the reducer is an abnormal state, the determination unit compares the oil temperature of the reducer with the temperature of the outside air of the vehicle.

5. The controller of claim 4, wherein when the oil temperature of the reducer exceeds the temperature of the outside air of the vehicle, the determination unit determines a second state of the oil temperature of the reducer as a normal state, and when the oil temperature of the reducer is equal to or lower than the temperature of the outside air of the vehicle, the determination unit determines that the second state of the oil temperature of the reducer is an abnormal state.

6. The controller of claim 5, wherein when the first state or the second state of the oil temperature of the reducer is the abnormal state, the control unit drives the reducer to adjust the oil temperature of the reducer.

7. The controller of claim 6, wherein when the first state or the second state of the oil temperature of the reducer is in the normal state, the control unit controls the vehicle disconnector apparatus to perform a fastening or fastening releasing operation.

8. A control method of a vehicle disconnector apparatus based on a temperature, the control method comprising:
 a receiving operation of receiving vehicle inside and outside information including a control command of a disconnector apparatus, an oil temperature of a reducer, and a temperature of outside air of a vehicle;
 a first state determination operation of determining a first state of the oil temperature of the reducer by comparing the oil temperature of the reducer with a preset reference temperature when the control command of the disconnector apparatus is received; and
 a disconnector apparatus control operation of controlling the disconnector apparatus according to the control command of the disconnector apparatus when a first state of the oil temperature of the reducer is a normal state,
 wherein the first state determination operation includes determining the first state of the oil temperature of the reducer as an abnormal state when the oil temperature of the reducer is equal to or lower than the reference temperature, and determining the first state of the oil temperature of the reducer as a normal state when the oil temperature of the reducer exceeds the reference temperature.

9. The control method of claim 8, further comprising:
 a reducer control operation of controlling the reducer to adjust the oil temperature of the reducer when the first state of the oil temperature of the reducer is the abnormal state.

10. The control method of claim 9, further comprising:
 a second state determination operation of determining a second state of the oil temperature of the reducer by comparing the oil temperature of the reducer with the temperature of the outside air of the vehicle after the reducer control operation.

11. The control method of claim 10, wherein the second state determination operation includes determining a second state of the oil temperature of the reducer as an abnormal state when the oil temperature of the reducer is equal to or lower than the reference temperature, and
 determining the second state of the oil temperature of the reducer as a normal state when the oil temperature of the reducer exceeds the reference temperature.

12. The control method of claim 11, wherein the disconnector apparatus control operation includes controlling the disconnector apparatus according to the control command of the disconnector apparatus when the second state of the oil temperature of the reducer is the normal state.

* * * * *